March 15, 1960
S. DU PONT
2,928,478
FREELY TILTING ROTOR FOR SELF SUSTAINING
AIRCRAFT WITH ERECTING MECHANISM
AND THE ERECTING MECHANISM
Filed Aug. 3, 1955
2 Sheets-Sheet 1
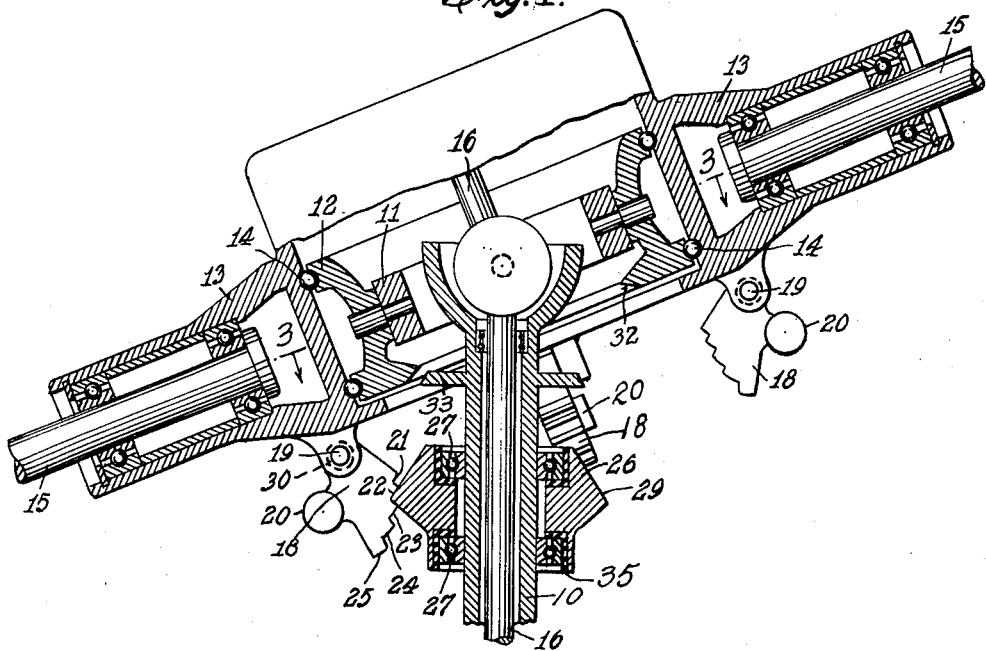
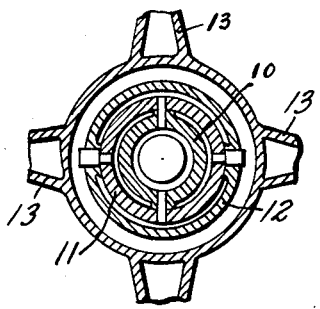
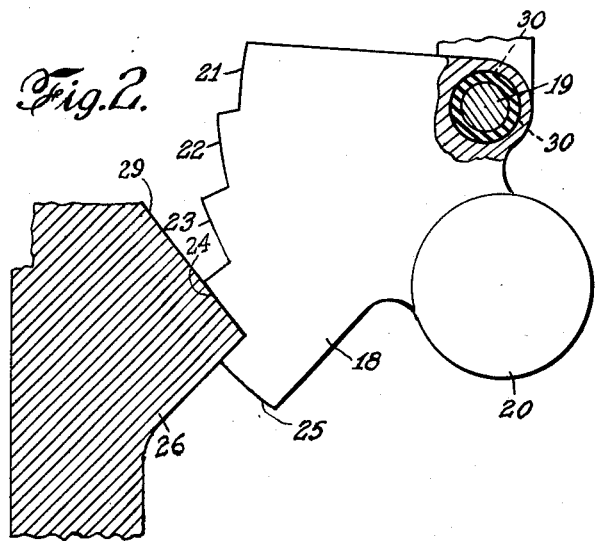
INVENTOR.
STEPHEN du PONT
BY
Bohleber, Jasatt & Montstream
ATTORNEYS

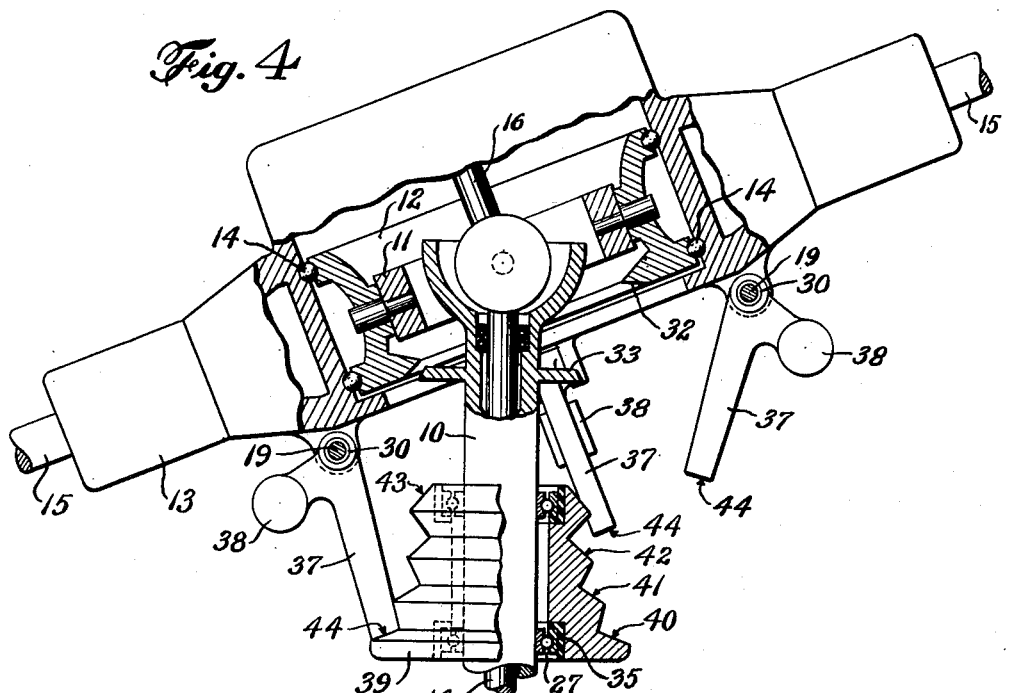

United States Patent Office 2,928,478
Patented Mar. 15, 1960

2,928,478

FREELY TILTING ROTOR FOR SELF SUSTAINING AIRCRAFT WITH ERECTING MECHANISM AND THE ERECTING MECHANISM

Stephen du Pont, Westport, Conn., assignor to Doman Helicopters, Inc., Danbury, Conn., a corporation of Delaware Application August 3, 1955, Serial No. 526,198

14 Claims. (Cl. 170—160.55)

The invention relates to a combination of a rotor and erecting mechanism therefor for a self sustaining aircraft, such as a helicopter and to the erecting mechanism. The rotor has a rotor hub which is freely tiltable so that it assumes angular positions with respect to the pylon upon which the rotor is mounted. The pylon preferably is non-rotating. When the aircraft is on the ground with the rotor rotating at slow speed, such as when its rotation is being stopped or started, the rotor may tilt from horizontal. With blade tip droop, because of the flexibility of the blade, and rotor tilt, the blades may come sufficiently close to the ground to be dangerous to personnel standing underneath the same or may bring the blades into contact with obstructions standing on the ground or fuselage structure and damage the blades.

A part or parts of the erecting mechanism is operated by centrifugal and gravitational force so that it comes into operation only at slower speeds of rotation of the rotor, when the speed of the rotor blades is so slow as to have insufficient support from aerodynamic lift to overcome blade tip droop. At higher speeds a part or parts of the erecting mechanism is moved away from operative position so that the rotor may tilt to a greater angle or any angle within the maximum allowable limit of the tilt of the rotor.

This application is a continuation in part of application S.N. 369,637 filed July 22, 1953, now abandoned.

It is an object of the invention to construct a rotor for a self sustained aircraft having a rotor erecting mechanism or device which is withdrawn from operative position at higher speeds of the rotor and comes into operative position at low speeds of the rotor and having a wide range of angular operation.

Another object is as above and in addition, provides an erecting mechanism which can be used on the free tilting type of rotor hub with a non-rotating pylon.

Another object is to construct a rotor having a rotor erecting or a tilt stop mechanism as above with a stepped surface, that is, a plurality of steps, each of which comes into operative position at a different relatively slow rotor speed.

Another object is to construct a rotor with a centrifugally and gravitationally actuated erecting or tilt stop mechanism for use with a free tilting rotor and a non-rotating pylon structure which is capable of leveling the rotor purely by centrifugal control and actuated by rotation of the rotor itself.

A still further object is to construct a rotor erecting mechanism which is not limited in its range of operation by the coefficient of friction between contacting surfaces.

Other objects of the invention will be more apparent from the following description when taken in connection with the accompanying drawings illustrating preferred embodiments of the invention in which:

Figure 1 is a section through a free tilting rotor showing one form of erecting mechanism in operative position;

Figure 2 is an enlarged view of the erecting mechanism of Figure 1; and

Figure 3 is a section on line 3—3 of Figure 1 through the universal joint for the rotor head;

Figure 4 is a section through a freely tilting rotor showing another embodiment of the erecting mechanism;

Figure 5 is a section through a freely tilting rotor showing a modified form of the embodiment of the erecting mechanism of Figure 4.

The rotor erecting or tilt stop mechanism operates to force the rotor to shift or rock from a tilted position with respect to its pylon to a more horizontal or level position during relatively slow rotation such as when slowing down of rotor speed or starting of its rotation. At higher speeds, a part of the tilt stop means is removed by centrifugal force to an inoperative position so that the rotor may freely tilt with respect to the pylon to its maximum allowable tilt. The erecting or tilt stop mechanism becomes operative only at reduced rotor speeds. The tilt of the rotor is normally about 15 degrees overall so that the tilt of the rotor of the drawings is exaggerated for the purpose of illustration.

The rotor mechanism includes a stationary pylon 10 which carries a universal joint 11 of any suitable form upon the end thereof which universal joint includes a non-rotating hub 12. A rotating hub 13 is rotatably mounted on the non-rotating hub by the bearings 14. Blades 15 are journalled in the rotating hub for cyclic pitch change or feathering on the longitudinal axis of each blade. Any desired blade pitch change mechanism may be used and hence none is shown. For a helicopter the rotor head is driven from a shaft 16 extending through the pylon which is suitably connected (not shown) to the rotating hub such as the connection of the Doman patent application Ser. No. 679,695, Patent 2,648,387 dated August 11, 1953.

Rotor erecting mechanism is provided which includes erecting lug means having at least one erecting lug although as a practical matter a plurality of lugs is preferred. The erecting lug means includes a tilt stop or erecting lug 18 pivotally mounted upon the rotating hub on a horizontal pivot 19. Centrifugal means is connected with the tilt stop lug to swing the same to operating positions, and at speeds above idling speed, the lug is swung to inoperative position. The centrifugal means particularly shown is a weight 20 carried by the tilt stop lug and shown particularly as being secured to or integral with the back edge of the tilt stop lug. The tilt stop lug has a plurality of steps 21, 22, 23, 24 and 25, there being five particularly shown, although any number may be used. Each step is at a different distance from the pivot 19, the step 21 having the minimum distance from the pivot and being located nearest to the pylon. For best results a plurality of tilt stops preferably not less than three are spaced around the periphery of the rotating hub. The tilt stop may be suitably cushioned if desired such as by a rubber bushing 30 to cushion the impact.

The rotor erecting mechanism or tilt stop also includes a collar or collar means 26 carried by the pylon 10 which is preferably rotatably mounted on the pylon by bearings 27. The collar has a contacting surface 29 which is approximately normal to a line extending through the pivot 19. With the collar spaced radially inwardly from the pivot 19 as shown the contacting surface is conical. The collar may be mounted on resilient supporting means 35 so as to cushion the contact of the tilt stop lug or cam therewith.

When the rotor plane is in any position whether normal or tilted with respect to the pylon, the erecting or tilt stop lugs with their pivots rotate with the rotor. Each tilt stop lug swings individually on its pivot from a position hanging down at slow rotor speeds, to swinging outwardly at higher rotor speeds through a swinging angle of nearly 90°. When the rotor is tilted, each tilt stop lug is rotating therewith in a plane parallel to that of the rotor or at an angle with respect to the axis of the pylon. The tilt stop collar 26 projects beyond the pylon and is represented by a plane normal to the pylon. Thus the tilted rotor causes each tilt stop lug to come closer to the stop collar on the low side of the circle of its rotation. At higher speeds each tilt stop lug swings outwardly away from contact with the collar but at a slower speed gravity overcomes at least some of the centrifugal force and each one successively contacts the tilt stop collar and limits the angle of rotor tilt. The lower the speed the more the tilt stop lug swings inwardly to present a higher step to the stop collar and thereby tilting the rotor to a lesser angle of tilt or preventing the tilt from increasing.

The erecting mechanism will normally swing the rotor through about a 10° angle and to secure this the five steps particularly shown will have a difference of radial dimension from the pivot 19 of about one inch. Each step is therefore about ⅕ of an inch high to give a 10° angular change in the plane of rotation of the rotor. It is not essential that the plane of rotation be returned to a plane normal to the pylon but only to such an angle as removes any danger of the blades swinging dangerously low. The stepped erecting mechanism permits a wide range of adjustment of the rotor without restriction as to a permissible friction angle.

A limit stop is also provided to limit the maximum tilt of the rotor when it is rotating at higher and operating speeds and when the tilt stops are centrifugally removed from operating position. This limit stop includes a shoulder or abutment 32 carried by the non-rotating part of the hub which contacts with a ring 33 mounted on the pylon.

Figures 4 and 5 illustrate forms of rotor erecting mechanisms in which each erecting lug has one cooperating contacting surface at its end and the plurality of steps are carried by the collar which is mounted on the pylon 10. Depending upon the location of the pivots 19 for the erecting lugs, the steps on the collar may take either a generally conical form or they may be approximately of equal radial distance from the center of the pylon or collar as in the form shown in Figure 5. The end of the lug and the steps of the collar provide interengaging or contacting erecting surfaces.

The rotor is of the same construction as that illustrated and described in connection with Figure 1 and is similarly numbered. At least one erecting or tilt stop lug 37 is pivoted to the rotor hub on its pivot 19 which has an axis. The pivot may be cushioned such as by a resilient bushing 30. Preferably a plurality of lugs are provided distributed around the periphery of the underside of the rotor hub 13. The erecting lug carries a centrifugal and gravitational weight or mass 38 spaced from the pivot 19 so that the lugs are moved to inoperative position with respect to the collar 39 at higher speeds of the rotor. At lower speeds, the gravitational force on the mass pivots each lug into a position where it will contact the collar or collar means or particularly one of the successive steps 40, 41, 42, and 43 on the collar. The collar is rotatably mounted on the stationary pylon 10 by suitable bearings 27 which may be cushioned in any way such as by resilient bushings 35. The collar of Figure 4 has been illustrated with a series of four successive steps.

When the rotor is tilted and slows down, the erecting or tilt stop lugs of the erecting lug means engage the lowermost step 40 of the collar and shifts or propels the rotor towards a more level position. As the rotor continues to slow down, the lug or lugs are pivoted by the gravitational force of the mass to the next step 41 which shifts the plane of rotation of the rotor to a more level position and so on until the rotor is shifted to a substantially level position with respect to the pylon. With the pivot 19 for the erecting means well above the position of the collar on the pylon, when the rotor is level, the steps give a generally conical or arcuately conical shape to the collar. When the rotor is in level position, the uppermost step 43 is a minimum distance from the axis of the pivot so that the lower steps provide progressively increasing distances between the pivot beginning from the top step to the bottom step. The shoulder between the steps on the collar prevents the erecting lug from shifting to a higher step on the collar in the event that the speed is low and the tilt of the rotor is great.

The construction of Figure 5 is similar to that shown in Figure 4 and as described herein. In this construction, the pivot 19 for the erecting lug means or lugs is lower relatively to the position of the collar 47 on the pylon, with the result that the successive steps 48, 49, 51 and 52 are approximately the same radial distance from the axis of the pylon or the collar. In level position of the rotor the uppermost step 52 provides a minimum distance between the step and the axis of the pivot 19 for the erecting lug 37 and the succeeding lower steps are at increasing distances therefrom. The erecting lugs are essentially similar to those of Figure 4 except that the centrifugal mass is located at a slightly different point. The operation of the erecting mechanism of Figure 5, however, is like that of the erecting mechanism described in connection with Figure 4. In this construction also, the interengaging surfaces of the steps are each normal to a line extending from the surface or step being contacted by the lugs to the axis of the pivot of the erecting lug.

In the forms of erecting mechanism illustrated, the successive steps may be carried by one of the means including the erecting lug means and the collar means. The interengaging surface of the erecting lugs or lug means and of the steps of the collar or collar means are normal to a line extending from the surface or step of the collar being contacted by a lug and passing through the axis of the pivot 19 for the erecting lug so that the erecting force passes through the axis of the pivot. The steps illustrated on the collars of Figures 4 and 5 are of greater extent than usually necessary because the angle of tilt of the rotor is greater, for the purpose of illustration, than that normally assumed by the rotor. Furthermore, by increasing the number of steps the relative spacing therebetween can be reduced.

The invention is presented to fill a need for improvements in a freely tilting rotor for self sustaining aircraft with erecting mechanism and the erecting mechanism. It is understood that various modifications in structure, as well as changes in mode of operation, assembly and manner of use, may and often do occur to those skilled in the art, especially after benefiting from the teachings of the invention. Hence it will be understood that this disclosure is illustrative of preferred means of embodying the invention in useful form by explaining the construction, operation and advantages thereof.

What is claimed is:

1. A rotor mechanism for self sustaining aircraft comprising a non-rotating pylon, a universal joint carried on the pylon, a freely tilting rotor rotatably mounted on the universal joint including a rotating hub and blades extending from the hub, and rotor erecting mechanism including erecting lug means having at least one erecting lug and collar means mounted for rotation on the pylon adjacent to the lug means, a horizontal pivot for each lug having an axis and pivotally mounting each erecting lug on the hub below the universal joint and radially spaced from the pylon, interengaging surfaces carried by the erecting lug means and the collar means including a plurality of successive steps carried by one of the means, each step being at a different distance from the pivot and the first step having the minimum distance from the pivot, centrifugal and gravitational means connected with each erecting lug to swing the same outwardly at high speeds and at slow speeds to swing the lug inwardly, and the interengaging surfaces when in contacting position having an angle substantially normal to a line extending from the engaged surfaces and passing through the axis of the pivot.

2. A rotor mechanism for self sustaining aircraft comprising a non-rotating pylon, a universal joint carried on the pylon, a freely tilting rotor rotatably mounted on the universal joint including a rotating hub and blades extending from the hub, and rotor erecting mechanism including erecting lug means having at least one erecting lug and collar means mounted for rotation on the pylon adjacent to the lug means, a horizontal pivot for each lug having an axis pivotally mounting each erecting lug means on the hub below the universal joint and radially spaced from the pylon, a plurality of successive steps carried by one of the means of the erecting mechanism, each step being at a different distance from the pivot and the first step having the minimum distance from the pivot, centrifugal and gravitational means connected with each erecting lug to swing the same outwardly at high speeds and at slow speeds to swing the lug inwardly, the collar means having a surface means in position to be engaged by the erecting lug means and the surface means during contact having an angle substantially normal to a line extending from the portion of the surface means contacted by the lug means and passing through the axis of the pivot.

3. A rotor for self sustaining aircraft comprising a non-rotating pylon, a universal joint carried on the pylon, a freely tilting rotor rotatably mounted on the universal joint including a rotating hub and blades extending from the hub, a tilt stop including at least one tilt stop lug, a horizontal pivot having an axis pivotally mounting each tilt stop lug on the hub below the universal joint and radially spaced from the pylon, a plurality of successive steps carried by each tilt stop lug, each step being at a different distance from the pivot and the first step having the minimum distance from the pivot and being located nearest to the pylon, centrifugal and gravitational means connected with the tilt stop lug to swing the same outwardly at high speeds and at slow speeds to swing the steps of the lug inwardly, and a collar mounted for rotation on the pylon having a surface in position to be engaged by the steps of the tilt stop lug and the surface during contact having an angle substantially normal to a line extending from the portion of the surface contacted by the lug and passing through the axis of the pivot.

4. A rotor as in claim 3 in which the steps of the tilt stop form less than a quadrant measured from the pivot.

5. A rotor as in claim 3 in which the centrifugal and gravitational means are secured to the tilt stop lug.

6. A rotor as in claim 3 including a resilient bushing carried by the pivot and upon which bushing the tilt stop lug is mounted.

7. A rotor for self sustaining aircraft comprising a non-rotating pylon, a universal joint carried on the pylon, a freely tilting rotor rotatably mounted on the universal joint including a stationary hub, a rotating hub and blades extending from the rotating hub, a tilt stop including at least one tilt stop lug, a horizontal pivot having an axis pivotally mounting each tilt stop lug on the hub below the universal joint and radially spaced from the pylon, a plurality of successive steps carried by each tilt stop lug, each step being at a different distance from the pivot and the first step has a minimum distance from the pivot and is located nearest to the pylon, centrifugal and gravitational means connected with the tilt stop lug to swing the same outwardly at high speeds and at slow speeds to swing the steps of the lug inwardly, a collar rotatably mounted on the pylon having a surface in position to be engaged by the steps of the tilt stop lug and the surface during contact having an angle substantially normal to a line extending from the portion of the surface contacted by the lug and passing through the axis of the pivot, and a tilt limit stop including a flange carried by the stationary hub and a flange carried by the pylon.

8. A rotor mechanism for self sustaining aircraft comprising a non-rotating pylon, a universal joint carried on the pylon, a freely tilting rotor rotatably mounted on the universal joint including a rotating hub and blades extending from the hub, rotor erecting mechanism including erecting lug means having at least one erecting lug, a collar mounted for rotation on the pylon to be engaged by said lug means, a horizontal pivot for each erecting lug having an axis pivotally mounting the lug on the hub below the universal joint and radially spaced from the pylon, a plurality of successive steps of circular form carried by the collar, each step being vertically spaced on the collar to provide different distances from the pivot and the upper step providing a minimum distance from the pivot, centrifugal and gravitational means connected with each lug to swing the same outwardly at high speeds and at slow speeds to swing the lug inwardly, the surface of each step to be engaged by the erecting lug means and the surface during contact having an angle substantially normal to a line extending from the surface contacted by the lug means and passing through the axis of the pivot.

9. A rotor for self sustaining aircraft comprising a non-rotating pylon, a universal joint carried on the pylon, a freely tilting rotor rotatably mounted on the universal joint including a rotating hub and blades extending from the hub, rotor erecting mechanism including erecting lug means of having at least one erecting lug, and a collar mounted for rotation on the pylon to be engaged by said lug means, a horizontal pivot for each erecting lug having an axis pivotally mounting the lug on the hub below the universal joint and radially spaced from the pylon, a plurality of successive steps of circular form carried by the collar, each step being vertically spaced on the collar and of increasing diameter from top to bottom to provide a different distance from the pivot and the upper step providing a minimum distance from the pivot, centrifugal and gravitational means connected with each lug to swing the same outwardly at high speeds and at slow speeds to swing the lug inwardly, the surface of each step to be engaged by the erecting lug means and the surface during contact having an angle substantially normal to a line extending from the surface contacted by the lug means and passing through the axis of the pivot.

10. A rotor for self sustaining aircraft comprising a non-rotating pylon, a universal joint carried on the pylon, a freely tilting rotor rotatably mounted on the universal joint including a rotating hub and blades extending from the hub, rotor erecting mechanism including erecting lug means of having at least one erecting lug, and a collar mounted for rotation on the pylon to be engaged by said lug means, a horizontal pivot for each erecting lug having an axis pivotally mounting the lug on the hub below the universal joint and radially spaced from the pylon, a plurality of successive steps of circular form carried by the collar, each step being vertically spaced on the collar and approximately of the same diameter to provide a different distance from the pivot and the upper step providing the minimum distance from the pivot, centrifugal and gravitational means connected with each lug to swing the same outwardly at high speeds and at slow speeds to swing the lug inwardly, the surface of each step to be engaged by the erecting lug means and the surface during contact having an angle substantially normal to a line extending from the surface contacted by the lug means and passing through the axis of the pivot.

11. A rotor erecting mechanism for self sustaining aircraft having a non-rotating pylon and a rotating rotor hub comprising erecting lug means having at least one erecting lug and collar means adapted to be mounted for rotation on the pylon, a horizontal pivot carried by each lug and having an axis for pivotally mounting each erecting lug on a hub and radially spaced from the pylon, interengaging surfaces carried by the erecting lug means and the collar means including a plurality of successive steps carried by one of the said means, each step providing progressively a different distance relatively to the pivot, centrifugal and gravitational means carried by each erecting lug spaced from the pivot to swing the same outwardly at high speeds and at slow speeds to swing the lug inwardly, and the interengaging surfaces when in contact having an angle substantially normal to a line extending from the engaged surface and passing through the axis of the pivot.

12. A rotor erecting mechanism for self sustaining aircraft having a non-rotating pylon and a rotating rotor hub comprising erecting lug means having at least one erecting lug and a collar adapted to be mounted for rotation on the pylon, a horizontal pivot carried by each lug and having an axis for pivotally mounting each erecting lug on the hub, an interengaging surface carried by each erecting lug, a plurality of successive circular steps carried by the collar providing interengaging surfaces contacted by the interengaging surface on the lug, each step providing different distances from the pivot, centrifugal and gravitational means carried by each erecting lug to swing the same outwardly at high speeds and at slow speeds to swing the lug inwardly, and the interengaging surfaces when in contacting position having an angle substantially normal to a line extending from the engaged surface and passing through the axis of the pivot.

13. A rotor erecting mechanism for self sustaining aircraft having a non-rotating pylon and a rotating rotor hub comprising erecting lug means having at least one erecting lug and a collar adapted to be mounted for rotation on the pylon, a horizontal pivot carried by each lug and having an axis for pivotally mounting each erecting lug on the hub, an interengaging surface carried by each erecting lug, a plurality of circular successive steps carried by the collar providing interengaging surfaces contacted by the interengaging surface on the lug, the steps having successively increasing diameters from the top thereof, each step providing different distances from the pivot, centrifugal and gravitational means carried by each erecting lug to swing the same outwardly at high speeds and at slow speeds to swing the lug inwardly, and the interengaging surfaces when in contacting position having an angle substantially normal to a line extending from the engaged surface and passing through the axis of the pivot.

14. A rotor erecting mechanism for self sustaining aircraft having a non-rotating pylon and a rotating rotor hub comprising erecting lug means having at least one erecting lug and a collar adapted to be mounted for rotation on the pylon, a horizontal pivot carried by each lug and having an axis for pivotally mounting each erecting lug on the hub, an interengaging surface carried by each erecting lug, a plurality of circular successive steps carried by the collar providing interengaging surfaces contacted by the interengaging surface on the lug, the steps having approximately the same diameter, each step providing different distances from the pivot, centrifugal and gravitational means carried by each erecting lug to swing the same outwardly at high speeds and at slow speeds to swing the lug inwardly, and the interengaging surfaces when in contacting position having an angle substantially normal to a line extending from the engaged surface and passing through the axis of the pivot.

References Cited in the file of this patent

UNITED STATES PATENTS

| Number | Name | Date |
| --- | --- | --- |
| 1,333,256 | Jurevich | Mar. 9, 1920 |
| 1,503,405 | Wheeler | July 29, 1924 |
| 2,151,215 | Larsen | Mar. 21, 1939 |
| 2,465,674 | Crowell | Mar. 29, 1949 |
| 2,522,148 | Traxler | Sept. 12, 1950 |